Aug. 6, 1935.                P. W. KOCH ET AL                2,010,191
                                 TURN INDICATOR
                              Filed June 25, 1932
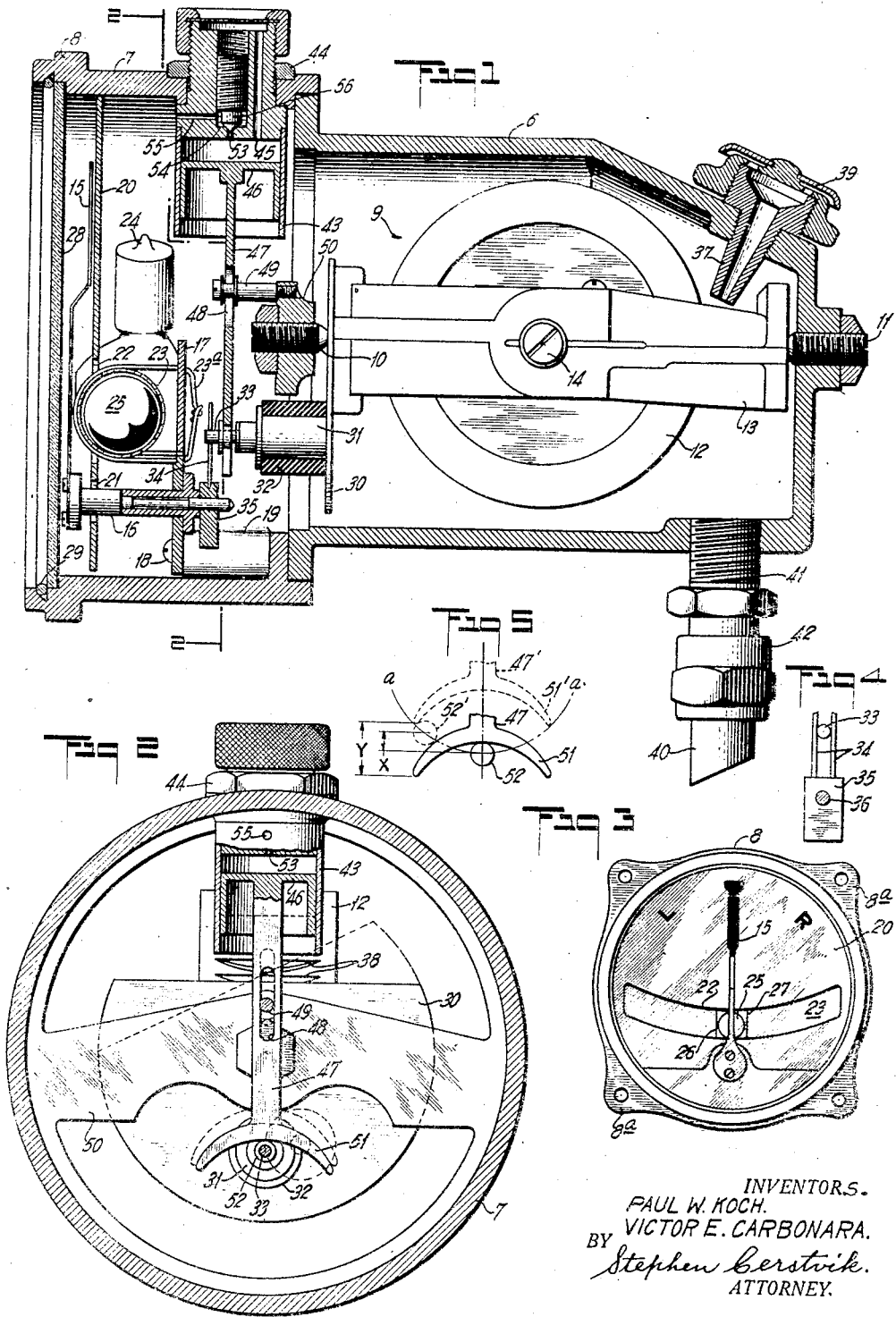
INVENTORS.
PAUL W. KOCH.
VICTOR E. CARBONARA.
BY Stephen Cerstvik.
ATTORNEY.

Patented Aug. 6, 1935

2,010,191

UNITED STATES PATENT OFFICE 2,010,191

TURN INDICATOR

Paul W. Koch, Brooklyn, and Victor E. Carbonara, Rockville Centre, N. Y., assignors to Bendix Aviation Corporation, South Bend, Ind., a corporation of Delaware Application June 25, 1932, Serial No. 619,348

5 Claims. (Cl. 33—204)

The present invention relates to means for indicating angular movements of a mobile or dirigible object about one of its axes, and more particularly to novel centralizing and calibrating means therefor.

One of the objects of the invention is to provide, in an instrument for indicating the rate and magnitude of angular movements of a mobile or dirigible object, novel means for centralizing the actuating element thereof and for accurately calibrating said instrument.

Another object is to provide, in a turn indicating mechanism including a gyroscope having a rotor arranged to be driven by fluid pressure and means of the type disclosed in copending application of Adolf Urfer, Serial No. 544,026, filed June 12, 1931, now Patent 1,939,375, Dec. 12, 1933, for producing a restoring force on the gyroscope which opposes the precession of the latter and which is greater when the speed of the rotor increases due to an increase in the fluid pressure, novel means whereby the mechanism may be calibrated.

Still another object is to provide in a turn indicating mechanism employing a gyroscope operated by the impact of a flow of fluid thereagainst, pneumatic means for centralizing the gyroscope after precession and to simultaneously dampen the oscillations thereof in order to produce steady indications during operation and arranged to be operated from the same source of fluid pressure which operates the gyroscope and embodying novel means whereby the mechanism may be easily and accurately calibrated.

A still further object is to provide in a turn indicating mechanism embodying a gyroscope driven by fluid pressure and pneumatic means for centralizing and damping the gyroscope, novel means included in said centralizing means whereby said mechanism may be readily and accurately calibrated and the effectiveness of the damping means greatly increased.

The above and other objects and advantages of the invention will appear more fully hereinafter from a consideration of the detailed description which follows, together with the accompanying drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views, Fig. 1 is a longitudinal section of one form of indicating means embodying the present invention.

Fig. 2 is a cross sectional view taken on line 2—2 of Fig. 1;

Fig. 3 is a front view of the instrument shown in Fig. 1;

Fig. 4 is a detail view of the connection between the pointer shaft and the gyro frame; and Fig. 5 is a diagrammatic view illustrating the operating principle of one form of novel calibrating means of the invention.

Referring to the drawing, the indicating device embodying the invention is of the type including a gyroscope adapted to be rotated about an axis perpendicular to the axis about which the turning of the mobile or dirigible object on which the device is mounted, is to be indicated, and adapted to precess about an axis perpendicular to both of the first mentioned axes, and means for indicating the precessional movements of the gyroscope which correspond to the angular movements and to the rate of such movements of the mobile object.

In the form shown, the device comprises an airtight casing 6 which may be of any suitable light-weight material as, for example, cast aluminum, hard rubber, or a phenol condensation product, and having an enlarged portion 7 which is provided with an annular flange 8 having ears or lugs 8a for suitably mounting the device on an instrument panel of the mobile object, the angular motion of which is to be indicated so that the longitudinal axis of the casing will coincide with or lie parallel to the longitudinal axis of the object. The gyroscope 9 is mounted in any suitable manner within the casing as by means of adjustable pivots or bearings 10 and 11 and includes a rotor 12 journaled in a frame 13 for rotation about a horizontal axis perpendicular to the axis constituted by the pivots 10, 11 in suitable bearings, one of which is shown at 14, so that the frame may oscillate about the axis 10, 11 due to the precessional forces acting thereon, when the frame and casing are turned about an axis perpendicular to both of the first mentioned axes. The rotor and its supporting frame may, however, be arranged in various other positions relative to the longitudinal axis of the casing, and hence the axis of the dirigible object, so that angular motion of said object about any one of its three axes may be indicated, as is well understood by those skilled in the art. The device embodying the present invention may be used on an aircraft, for example, to indicate the turn, bank or longitudinal inclination.

Means are provided for indicating the precessional movements of the gyroscope about the axis 10, 11 and, in the form shown, comprise a suitable pointer 15 carried by a shaft 16 rotatably mounted in a supporting member 17 secured to portion 7 of the casing in any suitable manner as, for example, by a screw 18 and a spacer 19. The pointer 15 is arranged to traverse a dial 20 carried by the casing and having an opening 21 at the lower portion thereof through which the pointer shaft 16 is adapted to extend. The dial 20 is also provided with a transverse arcuate slot 22 (Fig. 3) through which a bank indicator may be viewed such, for example, as the ball-type which consists of a curved glass vessel 23 filled with suitable damping liquid and sealed as indicated at 24, and having a ball 25 fitting snugly in the curved portion thereof so that upon a bank of the mobile object about the axis 10, 11 said ball will be actuated within the vessel 23 by the force of gravity or by centrifugal force when the mobile object is turned about a vertical axis. The vessel 23 is also secured to the supporting member 17 as by means of a wire 23a. When the mobile object is banked at the proper angle for a given rate of turn the ball 25 will remain exactly in the center of the arcuate vessel 23, such central position being indicated by reference marks 26 and 27, due to the fact that the centrifugal force at such a time is equal to the force of gravity. A cover 28 of some suitable transparent material such, for example, as glass or clear celluloid, is secured to the front of the case in a manner known in the art, as for example by a clamping ring 29, the pointer 15 and ball 25 being visible therethrough (Fig. 3). The precessional movements of the gyroscope frame 13 may be transmitted to the pointer 15 in any suitable manner, as by means of a transmission mechanism including a plate 30 carried by the frame and having a pin 31 secured thereto and encased within a rubber bushing 32, said pin 31 having an extension 33 which is adapted to engage a pair of pins 34, (Fig. 4), carried by a counterweight 35 secured to an extension 36 of the pointer shaft 16 on which the pointer 15 is carried.

Means are provided for rotating the rotor 12 about the axis 14 and, in the embodiment illustrated, comprise a nozzle 37 arranged to direct a fluid stream into a plurality of turbine buckets 38 formed on the periphery of the rotor (Fig. 2). The fluid may be introduced into the casing 6 and directed against the buckets 38 in any suitable manner as by means of said nozzle 37, the outer end of which is covered, though not sealed, by a dust cap 39, and may be exhausted from the casing through an outlet pipe 40 secured to the opposite side of the casing as by means of a nipple 41 and a coupling member 42. It will be apparent that the fluid pressure for driving the rotor may be derived in any suitable manner as, for example, by connecting the outlet pipe 40 to a Venturi tube (not shown) or to an exhaust pump, or to the intake manifold of the internal combustion engine of the vehicle on which the device is mounted, whereby the fluid may be connected to a compression pump for pumping the fluid into the casing, which fluid may then be exhausted to the atmosphere through the outlet pipe 40.

It is desirable that the gyroscope be returned to normal position after precessional movement thereof and to this end, means are provided for centralizing the gyro-frame 13 relative to the casing 6 about the precessional axis 10, 11, after the vehicle has made a turn, said means being so constructed and arranged that besides centralizing the frame 13 it will serve as a damping means, and includes the novel means of the invention whereby the instrument may be easily and accurately calibrated and the damping effect of the centralizing means greatly increased, as will be pointed out more fully hereinafter. In the form shown (Fig. 1), said centralizing means comprise a fluid pressure operated device including a cylinder 43 positioned within the enlarged portion 7 of the casing 6 and secured thereto in any suitable manner as by means of a lock-nut 44 and having a passage 45 which communicates with the atmosphere, and a piston 46 arranged to reciprocate within said cylinder. The piston 46 has secured thereto or formed integral therewith a piston rod 47 provided with a slot 48 intermediate its ends cooperating with a pin 49 carried by a transverse member 50 for guiding the piston 46 in its reciprocatory movements within the cylinder 43 and for preventing lateral movement of the piston rod. It is obvious that any other suitable guiding means than that shown, might be employed such, for example, as a pair of pins carried by the member 50 and disposed one on each side of the piston rod near the cam end thereof so that said pins could serve as stops to limit the movement of the piston. The piston is operatively associated with the plate 30 carried by the gyro-frame 13 through the novel calibrating means which comprise a cam member 51 secured to or formed integral with the piston rod 48 and being shown in the present embodiment in the shape of a crescent, the concave surface of which cooperates with a follower in the form of a roller 52 journaled on the extension 33 of the pin 31. By increasing the curvature of the concave face of the cam 51 and/or by increasing the length of the arcuate portion of said cam, any desired movement of the piston 46 may be obtained for various movements of the pin 31 upon precession of the frame 13, due to a turn about an axis perpendicular to the axis 10, 11 and axis 14, consequently controlling the movement of the pointer 15 with respect to the dial 20 through the pin connection 33, 34 and shaft 16. By using the cam and roller the damping effect of the piston 46 within the cylinder 43 is greatly increased as will be seen more clearly from the diagrammatic illustration in Fig. 5, wherein are shown two positions of the piston rod 47 and cam 51 for two positions of the roller 52, namely, the initial or zero position and a position in which the roller 52 has traversed an arc of about 30° by virtue of rotation of the plate 30 due to the precessional movements of the gyro-frame 13. As the roller 52 travels to the position 52', the vertical linear distance through which said roller has traveled is indicated at $x$, which would be the distance of piston travel if the piston rod were merely pivotally connected to the piston and to the pin 31 as is usually done in dash-pot structures of the prior art employed for damping purposes, and if the novel amplifying means of the invention and the guiding means for the piston rod were not used. But by preventing angular movement of the piston rod 47 through the guide pin 49 and by providing the cam 51 and the follower 52, the travel of the piston is greatly increased as indicated by the distance $y$ in Fig. 5, the position of the piston rod and the cam being indicated at 41' and 51' for the position 52' of the roller or follower. Consequently, the damping effect of the piston and cylinder is greatly increased for even very slight movements of the gyro-frame.

Normally the piston 46 and the pin 31, and consequently roller or follower 52, are in alignment along the diameter of the circular plate 30, which diameter lies parallel to the vertical axis about which a turn is made and in a common plane therewith passing longitudinally through the casing 6. Upon precession of the gyro-frame 13 about the axis 10, 11, due to the turning of the mobile object about said vertical axis, the roller 52 travels along an arc whose radius has its center coinciding with the axis 10, 11, the arc being indicated by a—a in Fig. 5 and is caused to travel along the concave surface of the cam member 51 thereby causing the latter to move upward as viewed in Fig. 2 to move the piston 46 within the cylinder 43. By virtue of the fact that cylinder 43 is in communication with the atmosphere by means of the passage 45, one side of the piston is at atmospheric pressure, while the internal side is at pressure less than atmospheric due to the vacuum created within the casing by the exhaustion of the air therefrom through the pipe 40. This difference in pressure on the piston 46, which is produced by the same source of fluid that drives the gyro rotor 12, tends to move the piston downward and, therefore, when the precessional forces of the gyroscope have ceased, the gyro-frame is returned to its initial centralized position by said pressure acting on the piston.

The cylinder 43 and the piston 46, in addition to their function of centralizing the gyroscope after precession, serve as a dash-pot, as pointed out above, to dampen the oscillations of the gyro-frame due to vibration or any other causes, thereby eliminating the use of a separate damping means and simplifying the construction of the indicating device. Also, by virtue of the novel cam and follower connection between the piston of the dash-pot and the gyro-frame, the effectiveness of the dash-pot is greatly increased. Should the supply of fluid be cut off for any reason, thereby rendering the gyroscope inoperative, then the centralizing force and damping action will also cease because of the fact that when the air is not being exhausted from the casing the interior of the latter is at the same pressure as the exterior and the pressure on both sides of the piston 46 is the same so that the gyroscope frame 13 will be free to oscillate about the axis 10, 11 to produce excessive oscillations or fluctuations of the pointer 15, thus indicating that the device is inoperative.

It will be apparent from the foregoing that since the piston 46 of the centralizing mechanism is operated from the same source of fluid pressure that drives the rotor 12 of the gyroscope, the restoring force which opposes the precession of the gyroscope is a function of the fluid pressure and hence the speed of the rotor, i. e., when the fluid pressure increases the speed of the rotor increases, thereby increasing the precessional force of the gyroscope, but at the same time the differential pressure which operates the piston 46 also increases in the same proportion so that a greater opposing force is applied to the gyroscope when the precessional force of the latter is greater and a smaller opposing force when the precessional force is smaller.

It is further desirable that the sensitivity of the centralizing and damping means be adjustable, and for this purpose there is provided in the cylinder 43 an adjustable leak for connecting the pressure side of the piston to the suction side, and in the form shown, said means comprise a passage 53 which communicates with the interior of the cylinder 43 and which also communicates with a chamber 54, the latter in turn having communication with the interior of the casing through a passage 55. The size of opening 53 is arranged to be adjusted by means of a valve member 56 which is movably threaded within the upper body portion of the cylinder 43. It will be apparent that when the valve member 56 completely closes the opening 53, full atmospheric pressure is imposed on the piston 46 through the passage 45, but as said valve member is moved upwardly by rotating it, the opening 53 establishes communication between the interior of the cylinder and the interior of the casing through the passage 55 thereby by-passing some of the air which enters through the passage 45. The sensitivity of the centralizing and damping mechanism is at a maximum when the opening 53 is completely closed and at a minimum when said opening is completely opened and various intermediate sensitivities may be obtained by adjusting the position of valve member 56 with respect to the opening 53.

There is thus provided a device for indicating the rate as well as the magnitude of the angular movements of a mobile or dirigible object upon which the device is mounted and embodying means whereby the gyro-frame is effectively centralized in proportion to the precessional forces acting thereon and whereby a substantial damping effect is produced on the gyro-frame for preventing undesirable oscillations thereof. There are also provided in the centralizing and damping mechanism novel calibrating means so constructed and arranged that all calibrations of the instrument may be obtained by varying the form and dimensions thereof.

While only one embodiment of the invention has been illustrated and described, other changes and modifications, which will now appear to those skilled in the art, may be made without departing from the scope of the invention. Reference is, therefore, to be had to the appended claims for a definition of the limits of said invention.

What is claimed is:

1. In a gyroscopic device, means for opposing the precession of the gyroscope element to centralize the latter about its axis of precession, and comprising a cylinder, a piston movable in said cylinder, and means operatively connecting said piston and said gyroscopic element for moving the former upon precession of the latter, said means including a cam member carried by said piston and a follower carried by and rotatable with the frame of the gyroscopic element.

2. In a gyroscopic device, means for opposing the precession of the gyroscopic element to centralize the latter about its axis of precession and comprising a cylinder, a piston movable in said cylinder, and means operatively connecting said piston and said gyroscopic element for moving the former upon precession of the latter, said means including a cresent-shaped cam carried by said piston and a roller cooperating with said cam to move said piston along a straight line upon an arcuate movement of said roller, the latter being carried by and rotatable with the frame of said gyroscope element.

3. In a gyroscopic device, means for opposing the precession of the gyroscope element to centralize the latter about its axis of precession and comprising a cylinder, a piston in said cylinder, and means operatively connecting said piston and said gyroscope element for moving the former upon precession of the latter, said means including a plate carried by and rotatable with the frame of the gyroscope element, a cam carried by the piston, and a follower carried by the plate and cooperating with said cam.

4. In a gyroscopic device, means for opposing the precession of the gyroscope element to centralize the latter and comprising a cylinder, a piston movable in said cylinder and having a piston rod, means for guiding the rod to move along a straight line, and means operatively connecting said rod and said gyroscope element for moving the former upon precession of the latter, said connecting means including a cam carried by the piston rod and a follower carried by the frame of the gyroscope element and cooperating with said cam.

5. In a gyroscopic device, a gyroscope mounted in a frame for precession about an axis, means for opposing the precession of said gyroscope to centralize the latter after precession and for damping oscillations of said gyroscope, said means comprising a cylinder and a piston movable in said cylinder, means operatively connecting said piston and said gyroscope for moving the former upon precession of the latter, said last-named means including a piston rod rigidly connected to the piston, and a member carried by said frame and movable angularly therewith about the axis of precession and having a direct connection with the piston rod such that for a given angular movement of said member the lineal travel of the piston is greater than the lineal component of travel of said member in the direction of travel of said piston.

PAUL W. KOCH
VICTOR E. CARBONARA.